Figure 1:
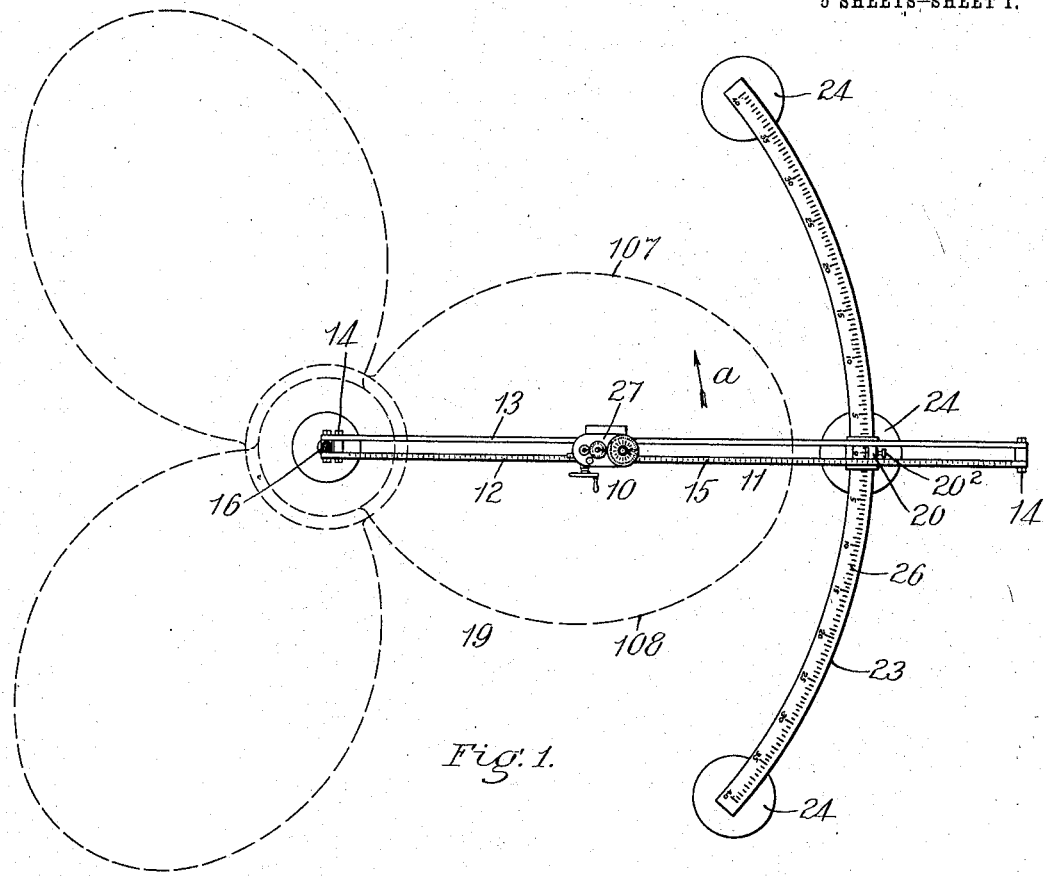

W. F. RICE.
PITCHOMETER.
APPLICATION FILED JULY 10, 1911.

1,021,797.

Patented Apr. 2, 1912.

5 SHEETS—SHEET 1.

Witnesses.
Franklin E. Low.
Leonard A. Powell.

Inventor.
Walter F. Rice
by his attorney, Charles S. Groding.

W. F. RICE.
PITCHOMETER.
APPLICATION FILED JULY 10, 1911.

1,021,797.

Patented Apr. 2, 1912.

5 SHEETS—SHEET 2.

Witnesses.
Franklin E. Low
Leonard A. Powell

Inventor:
Walter F. Rice
by his attorney
Charles T. Gooding

W. F. RICE.
PITCHOMETER.
APPLICATION FILED JULY 10, 1911.

1,021,797. Patented Apr. 2, 1912.
5 SHEETS—SHEET 3.

W. F. RICE.
PITCHOMETER.
APPLICATION FILED JULY 10, 1911.
1,021,797.
Patented Apr. 2, 1912.
5 SHEETS—SHEET 5.
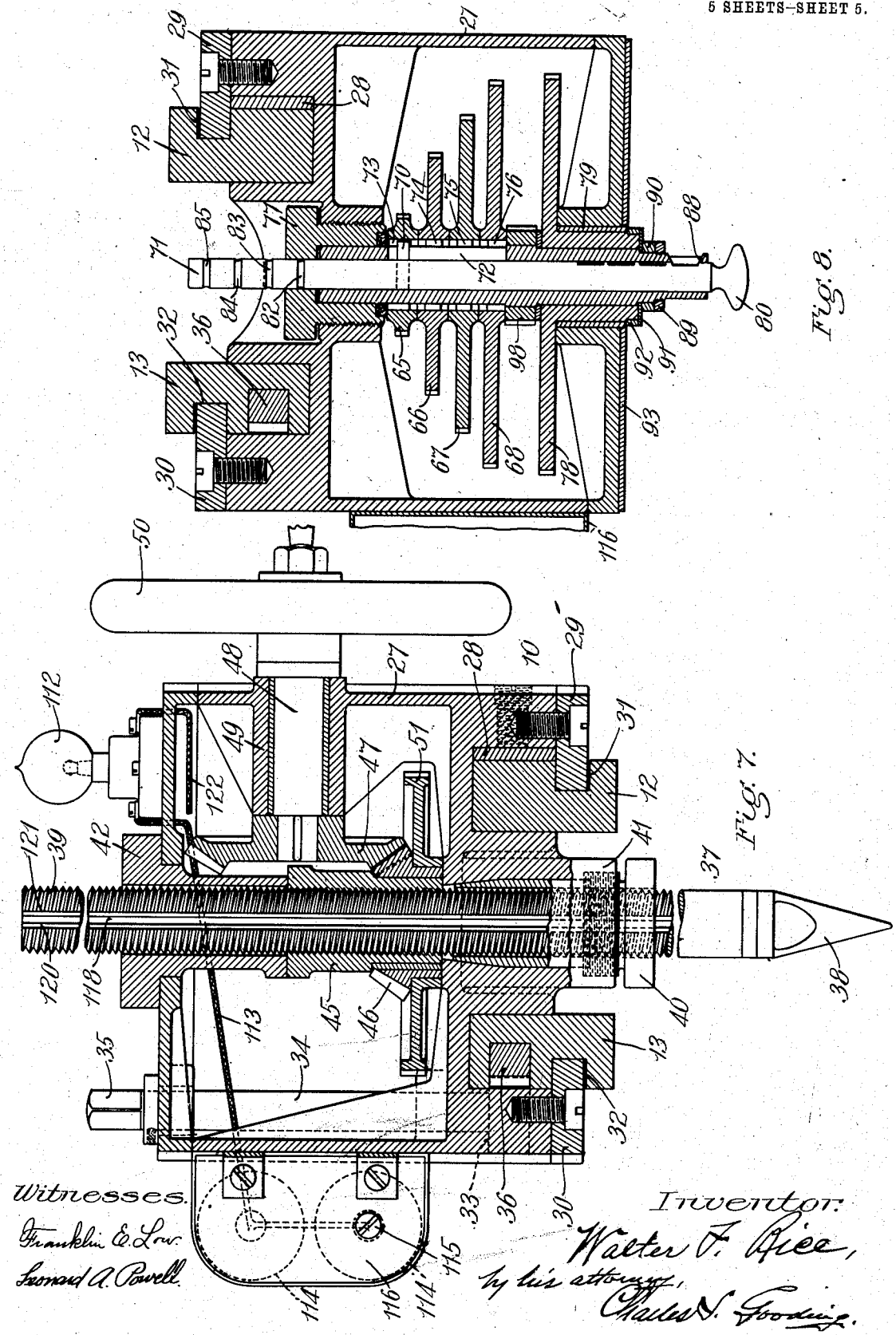
Witnesses.
Franklin E. Low.
Leonard A. Powell.
Inventor:
Walter F. Rice,
by his attorney,
Charles N. Gooding.

UNITED STATES PATENT OFFICE.

WALTER F. RICE, OF QUINCY, MASSACHUSETTS, ASSIGNOR TO FORE RIVER SHIP-BUILDING COMPANY, A CORPORATION OF MASSACHUSETTS.

PITCHOMETER.

1,021,797.

Specification of Letters Patent.

Patented Apr. 2, 1912.

Application filed July 10, 1911. Serial No. 637,689.

*To all whom it may concern:*

Be it known that I, WALTER F. RICE, a citizen of the United States, residing at Quincy, in the county of Norfolk and State of Massachusetts, have invented new and useful Improvements in Pitchometers, of which the following is a specification.

This invention relates to that class of measuring devices known as "pitchometers."

The object of the invention is to provide a measuring device which will quickly and accurately indicate the pitch of propeller blades for self-propelled vessels and which will also indicate the amount of material necessary to be removed from a propeller blade in order to bring it to the desired pitch, said device also being adapted to indicate the amount of material which is lacking on any portion of a propeller blade in order to bring the propeller blade to the desired pitch. To these ends my improved pitchometer is provided with a measuring finger which is set as hereinafter described and is also provided with an indicator consisting of a dial and a pointer or index finger which indicates the pitch of the propeller blades in inches. Said dial also has thereon another pointer which indicates the pitch of the propeller blades in feet. Another dial is also provided which has a scale thereon subdivided to indicate fractions of an inch, both positive and negative, the positive portion of the scale upon this dial indicating, according to the position of the pointer, the amount of excess material upon the propeller blades at a given point, the negative portion of the dial indicating the amount of material lacking at any particular point upon the propeller blades.

By means of my improved pitchometer all mathematical calculations for determining the pitch of propeller blades or the stock to be removed from said propeller blades are eliminated and said pitch or the stock to be removed or added to a propeller blade is determined entirely by means of the pitchometer in a mechanical manner.

The invention consists in the combination and arrangement of parts set forth in the following specification and particularly pointed out in the claims thereof.

Figure 2:
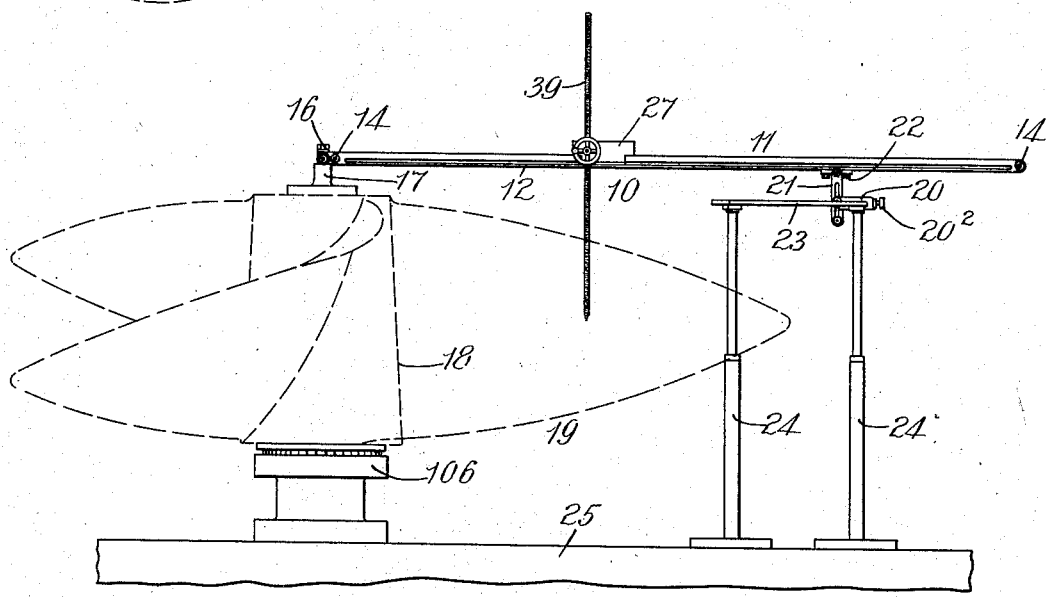
Figure 3:
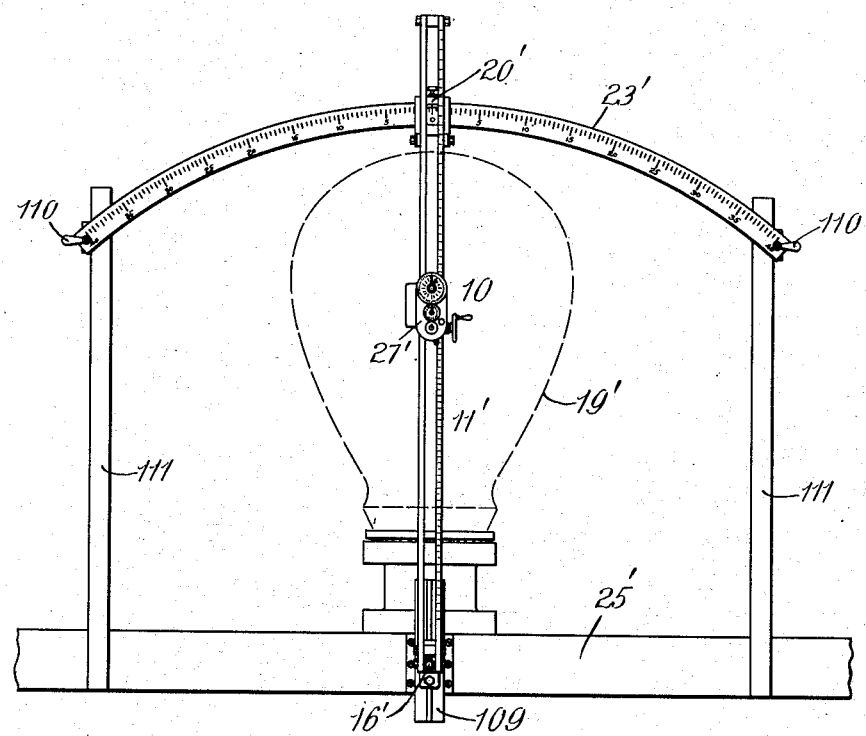
Figure 4:
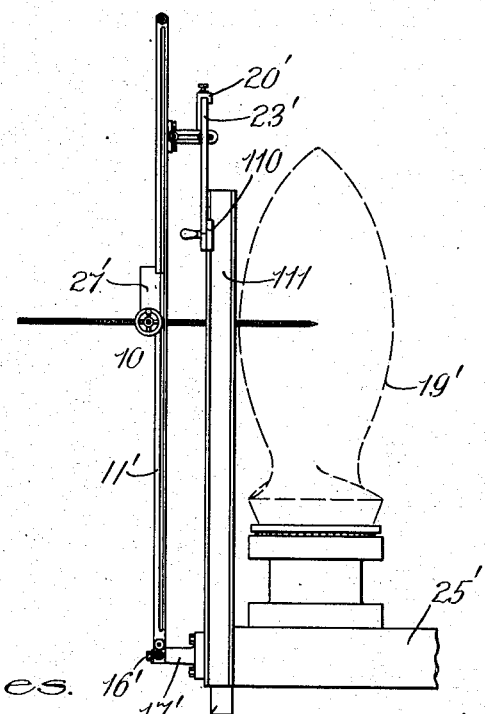
Figure 5:
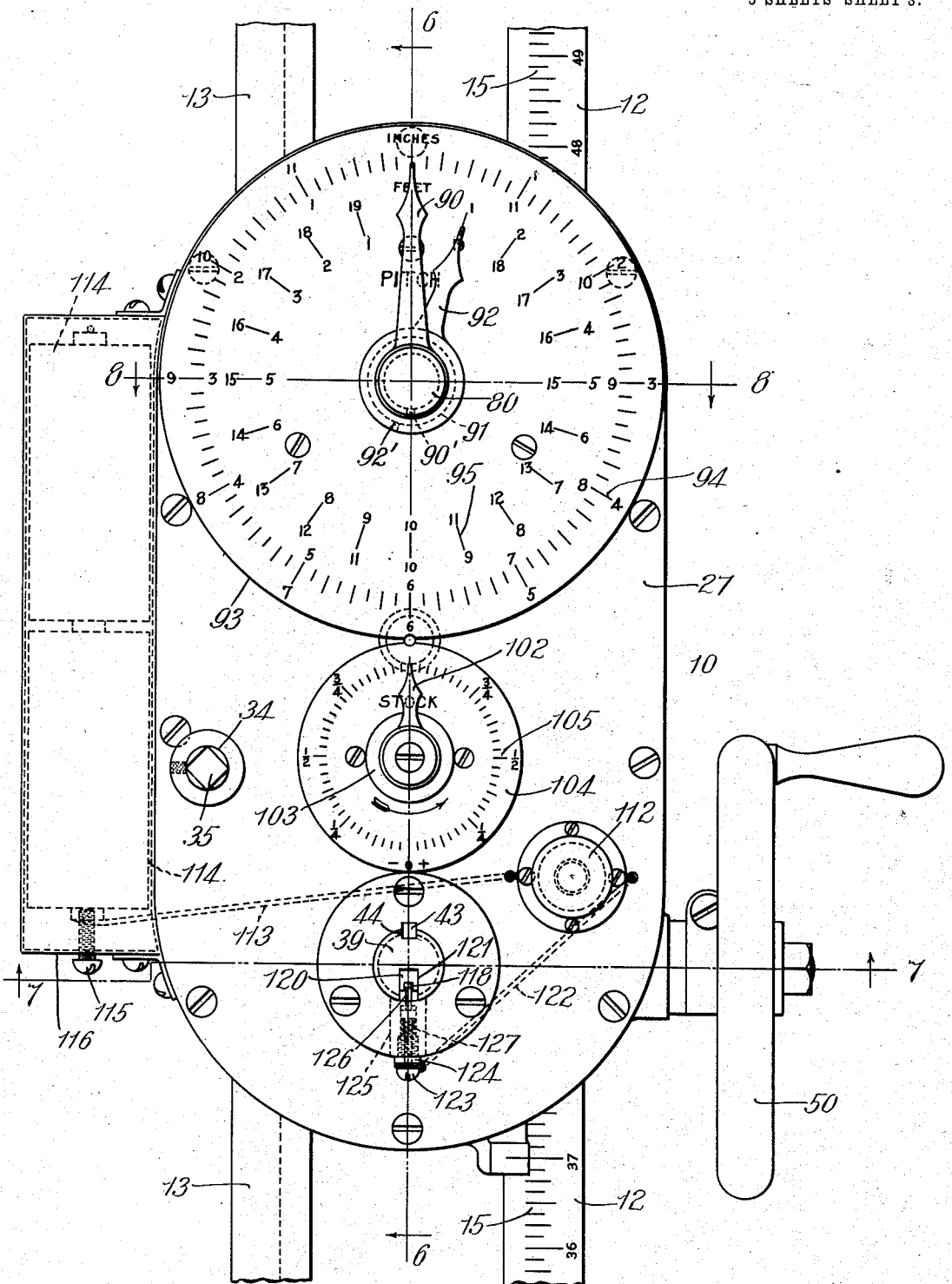
Figure 6:
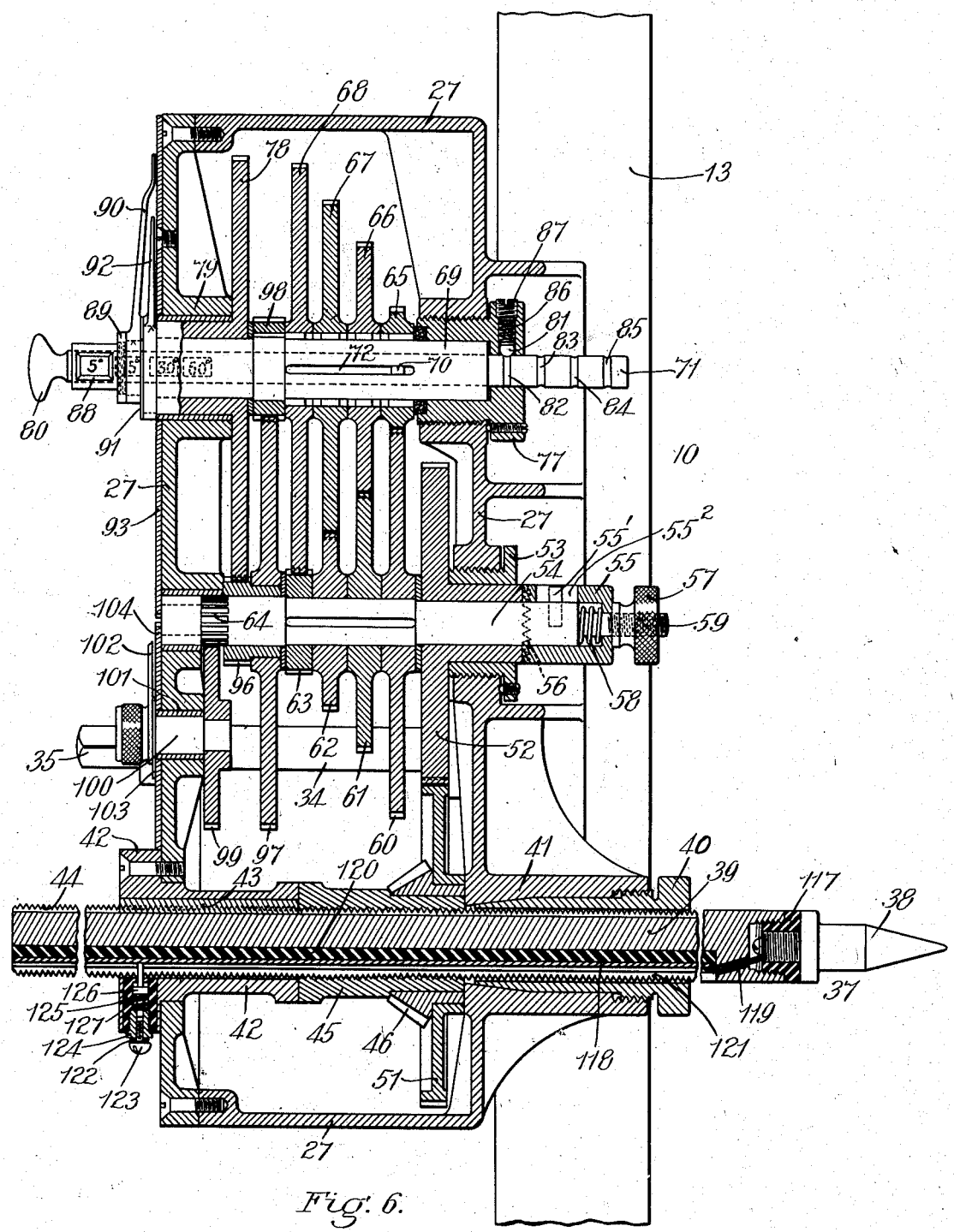

Referring to the drawings: Figure 1 is a plan view of my improved pitchometer showing the propeller in plan view by means of broken lines, two of the blades being broken away and the pitchometer being shown in position to be operated to determine the pitch and the amount of material to be removed from or added to a propeller blade. Fig. 2 is a front elevation of the same, the propeller being shown in broken lines. Fig. 3 is an elevation of the pitchometer showing the same in the position in which it is used in measuring a propeller blade when the propeller is in a horizontal position, one blade of the propeller being indicated in broken lines. Fig. 4 is a side elevation of the pitchometer and propeller blade shown in Fig. 3. Fig. 5 is an enlarged plan of my improved pitchometer showing a portion of the radial arm upon which it is supported broken away. Fig. 6 is a sectional elevation taken on line 6—6 of Fig. 5, the screw-threaded shaft of the measuring finger being broken away to save space in the drawings. Fig. 7 is a sectional elevation taken on line 7—7 of Fig. 5, the screw-threaded shaft of the measuring finger also being broken away. Fig. 8 is a detail sectional elevation taken on line 8—8 of Fig. 5.

Like numerals refer to like parts throughout the several views of the drawings.

In the drawings, referring to Figs. 1, 2, 4, 5, 6, 7 and 8, 10 is the pitchometer consisting of an arm 11 made in two parts 12 and 13 joined together at their opposite ends by bolts 14, 14, the arm 12 being provided with a scale 15 graduated in feet and inches. The arm 11 is rotatably mounted upon a pivot 16 fast to a center-piece 17 rigidly fastened to the hub 18 of the propeller 19, said pivot 16 being concentric with the hub 18 of the propeller, said propeller 19 consisting as a whole of the hub 18 and blades 108. A slide 20 is fastened by straps 21, 21 and bolts 22, 22 to the arm 11 and is adapted to slide upon an arc-shaped segment 23 which is fastened to standards 24, 24 fast, in turn, to a platen 25 upon which the propeller 19 is supported. The standards 24, 24 are adjustable longitudinally thereof to accommodate the device to propellers of different length hubs. The arc-shaped segment 23 is set in such a position that it is concentric with the pivot 16 and with the median axial line of the propeller 19, and has upon its upper face a scale 26 graduated to indicate angles, this scale being used to determine the angle at which the arm 11 is set. It will be understood that by the median axial line of the propeller is meant that imaginary line about which the propeller, as a whole, including the hub and blades rotates.

The measuring finger, the dials for indicating the pitch and the amount of material lacking or in excess on the propeller blades and the mechanism connecting said dials to the measuring finger are supported upon or contained within a casing 27, said casing being slidable longitudinally of said arm 11, and provided with suitable gibs 28, 29 and 30 Figs. 7 and 8. The gibs 29 and 30 are fastened to the under side of the casing 27 and project into slots 31 and 32 in the parts 12 and 13, respectively, of the arm 11. The casing is thus guided to slide longitudinally of said arm upon said parts 12 and 13 and is moved longitudinally of said parts by a pinion 33 fast to a vertical shaft 34 which terminates at its upper end in a squared portion 35 to which may be attached a suitable handle, whereby the shaft 34 may be rotated when desired. The pinion 33 meshes into a rack 36 fast to the side piece 13 of the arm 11, so that by rotating the shaft 34 the pinion 33 will be rotated and the casing 27, together with the parts attached thereto, will be moved longitudinally of the arm 11.

A measuring finger 37 is provided consisting of an end piece 38 and a screw-threaded shaft portion 39. The pointed end piece 38 is detachably fastened to the screw-threaded shaft 39. The screw-threaded shaft 39 is slidably mounted in a bushing 40 adjustably mounted in a boss 41 on the casing 27 and is also slidably mounted in a bearing 42 fast to said casing. The screw-threaded shaft 39 is prevented from rotating in the bearings 40 and 42 by a spline 43 fast to the bearing 42 and projecting into a groove 44 extending longitudinally of the screw-threaded shaft 39. Between the bearings 40 and 42, rotatably mounted upon the screw-threaded shaft 39 and having screw-threaded engagement therewith, is a rotatable nut 45 which, upon being rotated, imparts a longitudinal movement to the measuring finger 37. To impart a rotary motion to the nut 45, a bevel gear 46 is provided which is fastened to said nut and is rotated by means of a bevel gear 47 (Fig. 7) which is fastened to a shaft 48 mounted in a bearing 49 in the casing 27, rotary motion being imparted to said shaft 48 by a suitable hand wheel 50.

A spur gear 51 is fastened to the bevel gear 46 and meshes into the spur gear 52 which is rotatably mounted in an adjustable bearing 53 upon the casing 27. The gear 52 rotates freely upon a shaft 54, except when it is fastened thereto to rotate therewith by a clutch sleeve 55 provided with clutch teeth 56 which engage like teeth on the end of the hub of the gear 52 (see Fig. 6). Said clutch 55 may be thrown out of engagement by means of the nut 57 and spring 58, said nut having screw-threaded engagement with a reduced portion 59 of the shaft 54 at the right hand end thereof (Fig. 6). The clutch 55 is slidable on the shaft 54 and is prevented from rotating thereon by a pin 55' which is fast to the shaft 54 and projects into a slot $55^2$ provided in said clutch member 55. Spur gears 60, 61, 62 and 63 are keyed to the shaft 54 and a pinion 64 is formed upon the periphery of said shaft. The gears 60, 61, 62 and 63 mesh into gears 65, 66, 67 and 68, respectively, which are mounted to rotate upon a shaft 69 except when locked thereto by a key 70 which is fastened to a rod 71 extending longitudinally thereof through the shaft 69. The key 70 projects laterally from the rod 71 through a slot 72 in the shaft 69 and is adapted to project at its outer end into slots 73, 74, 75 and 76 Fig. 8 provided in the gears 65, 66, 67 and 68, respectively. The shaft 69 is rotatably mounted at one end thereof in an adjustable bearing 77 and at the other end thereof is rotatably mounted within the hub of a gear 78 which, in turn, is rotatably mounted in a bearing 79 upon the casing 27.

The pull-rod 71 is provided with a handle 80 at one end thereof by means of which it may be moved longitudinally thereof within the shaft 69 and is held in position with the key 70 projecting into any one of the slots 73, 74, 75 and 76 in the gears 65, 66, 67 and 68, respectively, by a ball 81 which is forced into any one of the annular grooves 82, 83, 84 and 85 in the periphery of said rod by a spring 86 which bears at one end thereof against the ball 81 and at the other end thereof against a screw 87 which has screw-threaded engagement with the adjustable bearing 77. When the ball 81 is projecting into the groove 82 the key 70 locks the gear 65 to the shaft 69. When the rod 71 is pulled toward the left from the position illustrated in Fig. 6 until the ball 81 projects into the groove 83, then the gear 66 is locked to the shaft 69 by the key 70 and when the rod 71 is pulled still farther toward the left until the ball projects into the groove 84, then the gear 67 is locked to the shaft 69, and again when the rod 71 is pulled toward the left until the ball 81 projects into the groove 85 the gear 68 is locked to the shaft 69. Thus, these gears 65, 66, 67 and 68 may be locked one at a time to the shaft 69 by the pin 70. Upon the pull-rod 71, to indicate the position of said pull-rod with reference to the several gears 65, 66, 67 and 68, are placed figures indicating angles as 5°, 15°, 30° and 60°, corresponding to similar angles indicated upon the scale 26 upon the arc-shaped segment 23, and these figures can be seen through a hole 88 in the shaft 69. A nut 89 has screw-threaded engagement with the left hand end of the shaft 69 (see Fig. 6).

The pointer 90 is split at 90′ (Fig. 5) and held in frictional engagement with the shaft 69 and is rotated by said shaft. Another pointer 92 is split at 92′ and held in frictional engagement with the hub of the gear 78, so that said pointer 92 is rotated by said gear 78. A washer 91 is interposed between the pointers 90 and 92.

A dial 93 is fastened to the outside of the casing 27 and has a scale 94 thereon indicating inches of pitch of the propeller blades, and to this scale the pointer 90 extends. Said dial also has upon its face a scale 95 having graduations indicating in feet the pitch of the propeller blades, and to this latter scale the pointer 92 extends. The gear 78 then, it will be understood, by frictional engagement therewith, actuates the pointer 92 and the shaft 69 when rotated actuates by frictional engagement the pointer 90. The scale 94 is subdivided to indicate inches from 0 to 12 and subdivisions thereof. The scale 95 is subdivided to indicate feet from 0 to 20.

The gear 78 meshes into a gear 96 rotatably mounted upon the shaft 54. Said gear 96 has fastened thereto another gear 97 which meshes into a gear 98 which is keyed to the shaft 69. The relative proportions of the gears 96, 97 and 98 are such that when the shaft 69 rotates once the pointer 92 will pass from 0 on the scale 95 to 1. The pinion 64 on the shaft 54 meshes into a gear 99 fast to a shaft 100 rotatably mounted in a bearing 101 in the casing 27 and having a pointer 102 held on said shaft by frictional engagement with a spring washer 103.

A dial 104 is fastened to the outside of the casing 27 and upon this dial is a scale 105 subdivided to indicate an inch and subdivisions thereof from 0 to 1 inch, the subdivisions on one side of the dial being plus, the subdivisions on the opposite side being minus.

It will be understood that the pointers 90 and 92 rotate about the dial 93 and that said dial is suitably engraved for pitch measurements in inches and feet, while the pointer 102 rotates about the dial 104 which is suitably engraved to indicate the amount of stock which is on the blades at a certain point over or under the amount required for a certain pitch.

The dial 104 and pointer 102 are used to determine the amount of stock which should be removed from the face of a blade of the propeller to bring the blade to the required pitch, or to measure the amount of stock that may be lacking on said propeller blade to cause it not to be of the required pitch. The ratio of the pitch of the gear 64 to the gear 99 is 1 to 4. Therefore, for each rotation of the nut 45 which advances the measuring screw 39, one half inch, the pointer 102 will make one quarter of a rotation. When the screw 39 is advanced one inch by rotating the same twice the pointer 102 will make one-half of a rotation, reading one inch on the dial 104.

Assuming that it is desired to measure the pitch of the propeller blades every 15°, the pull-rod 71 is moved from the position illustrated in Fig. 6 toward the left until the ball 81 engages the groove 83, when the number 15° will be visible through the aperture 88 in the shaft 69, and at this time the key 70 will project into the slot 74 in the gear 66 and lock said gear to the shaft 69. If, now, the hand wheel 50 is rotated until the nut 45 makes one complete rotation, the measuring screw 20 will advance ½ inch. If the pitch of the propeller blade is ½ inch in 15°, the total pitch in a full circle will be twenty-four times ½ inch or 12 inches, as 15° is 1/24 of a full circle. The diameters of the gears 51 and 52 being equal and the relative diameters of the gears 61 and 66 (which latter gear we now assume to be locked to the shaft 69 by the pull-rod 71) being equal, the shaft 69 will, therefore, make one complete rotation when the nut 45 makes one complete rotation, and the pointer 90 which is attached to said shaft 69 by frictional engagement will indicate 12 inches pitch on the dial 93 on the scale 94. The gear 98 is keyed to the shaft 69 and the pitch diameter of said gear is one-quarter that of the gear 97 into which it meshes. The relative pitch diameters of the gears 96 and 78 are as 1 to 5. It, therefore, follows that the pointer 92 will make one twentieth of a rotation while the pointer 90 makes a complete rotation, and hence when the nut 45 is rotated once the pointer 92 will make one twentieth of a rotation and will read upon the scale 95 one foot in pitch. The same principle hereinbefore described in relation to the relative dimensions of the different gears is used in measuring pitch every 5°, 30° and 60°, the gears for measuring the pitch for these angles being proportioned relatively to the pitch of the thread on the measuring screw 39 and the graduations on the dial 93 so that, for instance, if the pull-rod 71 is set at 30°, then the advance of the screw should be one inch, or two rotations of the nut 45, but as the gear 51 is equal in diameter to the gear 52 and the gear 62 is only one-half the diameter of the gear 67, it follows that two rotations of the nut 45 which would permit a longitudinal advancement of the screw 39 one inch would only rotate the shaft 69 once, causing the pointer 90 to pass over the dial 93 to indicate 12 inches pitch on the scale 94.

The operation of the device hereinbefore specifically and to some extent in general described is as follows: Still referring to Figs. 1, 2, 5, 6, 7 and 8 and assuming that it is desired to measure a propeller which lies in a horizontal position, the center-piece 17 is set concentric with the hub 18 of the propeller 19, the pivot 16 being concentric with said center-piece and in line with the median axial line of the hub 18 of the propeller. The arc-shaped piece 23 is adjusted by means of the adjustable standards 24, 24, so that the arm 11 is at right angles to the median axial line of the propeller hub 18 and the arc-shaped segment 23 is concentric with the median axial line of the propeller hub 18. The arm will now be free to swing upon the central pivot 16, the slide piece 20 moving freely upon the arc-shaped segment 23. The slide piece 20 is set to a central position on the arc-shaped segment 23 or at zero as indicated by the scale 26 on said arc-shaped segment. The propeller blade is then moved until it becomes central with the arm 11, said propeller blade being preferably mounted upon a rotatable stand 106 (Fig. 2). The gear casing 27 and the parts carried thereby are moved by means of a suitable handle attached to the shaft 34 and by means of the pinion 33 meshing into the rack 36 to the desired distance from the center of the propeller, the radial distance from the center of the hub being indicated by the graduations on the scale 15. The pull-rod 71 is then set for the number of degrees between which the readings are to be taken, this number of degrees being indicated on the pull-rod, as seen through the aperture 88 in the shaft 69. Everything is now in readiness to measure the pitch of the propeller blade. The arm 11 is now swung in the direction of the arrow $a$ (Fig. 1) to the upper edge 107 of the propeller blade 108, or to the desired degree on the arc-shaped segment 23 from which the readings are to be started and locked in position by the set-screw 20². The hand wheel 50 is then rotated until the point 38 of the measuring screw 39 touches the propeller blade. The time when the measuring finger touches the blade may be determined by the sense of touch or by the use of a miniature electric light or electric bell operated by batteries affixed to the casing 27 and connected by wiring in such a manner that the electric current will be completed upon touching the point of the measuring screw to the propeller blade, as hereinafter described. The pointers 90 and 92 are now set to zero on the dial 93 and the arm 11 is moved over the arc-shaped segment 23, the number of degrees corresponding to the number of degrees showing through the aperture in the shaft 69; in this case 15. The hand wheel 50 is now again turned until the point 38 touches the propeller blade 108 at which time the pitch of the blade between the two points measured, as hereinbefore described, may be read direct in feet and inches by means of the pointers 92 and 90, respectively, the figures being read on the dial toward the right. A second set of figures, both for inches and feet, is provided which may be read toward the left in cases where the readings are taken in working up the blade instead of down the blade. The preferable way, however, is to take the measurements from the upper edge of the blade downwardly and read the dial toward the right, it being understood that the terms "upwardly" and "downwardly" are used in connection with the use of the device when a propeller blade is in a horizontal position.

In order to determine whether the amount of stock on the propeller blades in a direction parallel to the axis of the propeller hub is correct, the arm 11 is set centrally with the propeller blade 108 and centrally with the arc-shaped piece 23 and parallel to the center line of the blade. The gear casing 27 is then set to bring the measuring screw 39 at the desired radial distance from the center of the hub. The pull-rod 71 is then set to the desired degree, (in this case 15°) and the measuring screw 39 advanced until the point 38 touches the blade. The pointer 102 adjacent to the dial 104 is then set to zero and the measuring screw 39 moved back from the blade until the pointer 102 reads one inch on the dial 104. The pointers 90 and 92 are then set to zero on the dial 93. The arm 11 is then moved through the desired angle on the arc-shaped piece 23 (in this case 15°) and the measuring screw 39 is again advanced until the pointers 90 and 92 indicate the required pitch, say 12 in this case. It is now evident that the measuring screw-point 38 should be one inch away from the propeller blade if the propeller blade is of the required pitch. The pointer 102 is then set to the one inch graduation on the dial 104 and the measuring screw advanced until the point 38 touches the propeller blade. The amount of stock to be removed or the amount that may be lacking at this point on the propeller blade will then be indicated by the pointer 102 on the dial 104, the plus sign indicating the stock to be removed and the minus sign indicating the amount that may be lacking. This amount, plus or minus, is noted and the measuring screw 39 drawn back from the blade until the pointers 90 and 92 read the required pitch (in this case 12) and the pointer 102 points to one inch on the dial 104, these readings occurring simultaneously. The pointers 90 and 92 are then set to zero and the arm 11 moved through the desired angle (in this case 15°) and the same method of measuring as has been hereinbefore described used for other desired points.

It is possible to take the readings of the excess amount of material or for the amount of material lacking on the blade by reading up or down the blade, as hereinbefore described in reading the pitch.

Care should be taken to always move the measuring screw 39 back until the pointers 90 and 92 read the required pitch and the pointer 102 reads one inch before setting the pointers 90 and 92 to zero. If this is not done the measurements will not be in the same plane and so will not give correct readings.

It will be noted from the above described method of using my improved pitchometer that when measuring for pitch the dial 93 is to be used alone, but when measuring for stock the two dials 93 and 104 are used in conjunction one with the other.

In the foregoing description of the use of the instrument the clutch 55 is assumed to be in engagement with the teeth on the hub of the gear 52 and is only disengaged when it is desired to move the measuring screw through a considerable distance at high speed without rotating all of the gears in the casing.

In order that the operator of the pitchometer hereinbefore described shall be able to perceive when the tip of the measuring finger contacts with the propeller blade, I have provided an electric signaling device, preferably consisting of an electric lamp 112 which I consider to be the most practicable form of electric device which can be employed in connection with a pitchometer. A bell might be employed in the electric circuit instead of a light, but a light is preferable as it is more sensitive and can be seen in a noisy place, such as a machine shop, whereas it might be difficult to hear a bell. The lamp 112 is connected by a wire 113 to one pole of a cell of batteries 114, 114, the other pole of said cell of batteries being connected by a screw 115 to the casing 116 in which said batteries are inclosed. The casing 116 is fastened to the main casing 27 and forms a portion thereof. The tip 38 of the measuring finger is insulated from the body portion thereof by being screwed into a sleeve 117 of insulating material. The sleeve 117 has screw-threaded engagement with one end of the screw-threaded body portion 39 of the measuring finger 37. A flat copper wire 118 is connected by an insulated wire 119 to the tip 38 and the flat wire 118 extends longitudinally of the body portion 39 of the measuring finger 37 and lies within a strip of insulating material 120 which is located in a slot 121 extending longitudinally of the measuring finger 37. A wire 122 connects the lamp 112 to a screw 123, said screw binding said wire to a socket 124 which has screw-threaded engagement with an insulating block 125 located in the bearing 42 which forms a portion of the casing 27. A plunger 126 is adapted to slide within the insulating block 125 and is held with a yielding pressure against the flat copper strip 118 by a spring 127. The electric circuit is completed when the finger tip 38 contacts with the propeller and the lamp is lighted to signal the operator that such contact has been made. The circuit, when completed, passes through the batteries 114, 114 through the wire 113, lamp 112, wire 122, screw 123, socket 124, plunger 126, flat copper wire 118, insulated wire 119 to the finger tip 38; thence from the finger tip through the propeller 19 along the arm 11 through the casing 27 of the pitchometer to the screw 115 which connects with one pole of the batteries 114 and thus, through said batteries, the circuit is completed.

In Figs. 3 and 4 my improved device is illustrated in the position adapted to measure blades in a vertical position. Referring to these figures, it will be seen that a centerpiece 17' is fastened to an adjustable support 109, which adjustable support is fastened to a platen 25'. The arc-shaped piece 23' is fastened by means of clamps 110 to upright I-beams 111, 111 which I-beams are fastened to the platen 25'. The arm 11' is pivoted upon the stud 16' which is in line with the median axial line of the propeller 19'. The arm 11' and the slide piece 20' are substantially the same as the parts 11 and 20 hereinbefore described. The gear casing 27' is mounted on the arm 11' and operated the same as the gear casing 27 and the parts supported thereon hereinbefore described. The operation of measuring the pitch and the amount of stock to be added to or removed from the blades is the same as hereinbefore described with relation to the measurement of the propeller in a vertical position.

It will be understood that while in the foregoing description it has been assumed that the pitch of the propeller blade being measured was twelve inches, still the instrument is capable of measuring the pitch of any propeller and also of indicating the amount in excess or the amount lacking on the propeller blades measured. For instance, if the instrument be set up on a propeller the pitch of which is unknown and the directions hereinbefore set forth are carried out, the correct pitch of the propeller blade will be indicated by the pointers 92 and 90 in feet, inches and fractions of an inch, respectively, on the dial 93, and it will also be understood that the indicator for the pitch may be used for a propeller the surface of the blades of which have been machined, but that in practice the indicator for indicating the amount in excess or the amount lacking of stock on the blades is only to be used in connection with propeller blades which have not been machined.

Having thus described my invention, what I claim and desire by Letters Patent to secure is:

1. A pitchometer having, in combination, an arm adapted to be pivotally mounted concentric with the median axial line of a propeller, an annular plate concentric with said propeller, a slide piece fast to said arm adapted to slide on said plate, a measuring finger mounted on said arm and movable parallel to said axial line, an indicator, and means connecting said measuring finger and indicator, whereby, when said finger is moved parallel to said axial line, said indicator will be operated to change its reading.

2. A pitchometer having, in combination, an arm, adapted to be pivotally mounted concentric with the median axial line of a propeller, an annular plate concentric with said propeller, said plate having a scale thereon indicating angles of different degrees, a slide piece fast to said arm adapted to slide on said plate adjacent to said scale, a measuring finger mounted on said arm and movable parallel to said axial line, an indicator, and means connecting said measuring finger and indicator, whereby, when said finger is moved parallel to said axial line, said indicator will be operated to change its reading.

3. A pitchometer having, in combination, an arm, adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, and mechanism connecting said nut and shaft whereby, when said nut is rotated, said shaft will be rotated and said finger will be moved parallel to said axial line.

4. A pitchometer having, in combination, an arm adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a plurality of trains of gears of different relative diameters connecting said nut and shaft, the final gear of each train rotatably mounted on said shaft, and means to lock each of said final gears one at a time to said shaft.

5. A pitchometer having, in combination, an arm adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a plurality of trains of gears of different relative diameters connecting said nut and shaft, the final gear of each train rotatably mounted on said shaft, a rod extending through said shaft longitudinally thereof and slidable therein, and a key fast to said rod projecting laterally therefrom through a slot provided in said shaft and adapted when in alinement therewith to project into a keyway provided in each of said final gears.

6. A pitchometer having, in combination, an arm adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a plurality of trains of gears of different relative diameters connecting said nut and shaft, the final gear of each train rotatably mounted on said shaft, a rod extending through said shaft longitudinally thereof and slidable therein, a key fast to said rod projecting laterally therefrom through a slot provided in said shaft and adapted when in alinement therewith to project into a keyway provided in each of said final gears, and means adapted to lock said rod against longitudinal movement.

7. A pitchometer having, in combination, an arm adapted to be pivotally mounted concentric with the median axial line of a propeller, an annular plate concentric with said propeller, said plate having a scale thereon indicating angles of different degrees, a slide piece fast to said arm adapted to slide on said plate adjacent to said scale, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a plurality of trains of gears connecting said nut and shaft, the final gear on each train rotatably mounted on said shaft, a rod extending through said shaft longitudinally thereof and slidable therein, a key fast to said rod projecting laterally therefrom through a slot provided in said shaft and adapted when in alinement therewith to project into a keyway provided in each of said final gears, and a series of numbers on said rod arranged longitudinally thereof and indicating degrees corresponding to degrees indicated on said annular plate scale.

8. A pitchometer having, in combination, an arm adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a train of gears of different relative diameters connecting said nut and shaft, the final gear of said train mounted on said shaft, and means to disconnect one of the gears of said train from another.

9. A pitchometer having, in combination, an arm adapted to be pivotally mounted concentric with the median axial line of a propeller, a rotatable nut carried by said arm, a measuring finger having screw-threaded engagement with said nut and movable longitudinally thereof parallel to said axial line, means to prevent said measuring finger from rotating, a rotatable shaft carried by said arm, an index finger on said shaft, a plurality of trains of gears of different relative diameters connecting said nut and shaft, the final gear of each train rotatably mounted on said shaft, means to lock each of said final gears one at a time to said shaft, and means to simultaneously disconnect all of said trains of gearing from positive connection with said nut.

In testimony whereof I have hereunto set my hand in presence of two subscribing witnesses.

WALTER F. RICE.

Witnesses:
B. C. BAILEY,
S. T. MACQUARRIE.